(12) United States Patent
Golic et al.

(10) Patent No.: US 8,312,291 B2
(45) Date of Patent: Nov. 13, 2012

(54) METHOD AND SYSTEM FOR BIOMETRIC AUTHENTICATION AND ENCRYPTION

(75) Inventors: Jovan Golic, Turin (IT); Madalina Baltatu, Turin (IT)

(73) Assignee: Telecom Italia S.p.A., Milan (IT)

( * ) Notice: Subject to any disclaimer, the term of this patent is extended or adjusted under 35 U.S.C. 154(b) by 621 days.

(21) Appl. No.: 12/448,596

(22) PCT Filed: Dec. 28, 2006

(86) PCT No.: PCT/EP2006/012562
§ 371 (c)(1),
(2), (4) Date: Sep. 30, 2009

(87) PCT Pub. No.: WO2008/080414
PCT Pub. Date: Jul. 10, 2008

(65) Prior Publication Data
US 2010/0017618 A1    Jan. 21, 2010

(51) Int. Cl.
*G06F 21/00* (2006.01)
(52) U.S. Cl. ............... 713/186; 726/5; 726/17; 726/21; 713/172; 382/115; 382/190
(58) Field of Classification Search .................. None
See application file for complete search history.

(56) References Cited

U.S. PATENT DOCUMENTS

| | | | |
|---|---|---|---|
| 6,219,794 | B1 | 4/2001 | Soutar et al. |
| 6,363,485 | B1 * | 3/2002 | Adams et al. ................. 713/186 |
| 2004/0148509 | A1 * | 7/2004 | Wu ............................... 713/186 |

FOREIGN PATENT DOCUMENTS

| | | |
|---|---|---|
| WO | WO 00/51244 | 8/2000 |
| WO | WO 02/078249 A1 | 10/2002 |

OTHER PUBLICATIONS

Kevennar et al. "Face Recognition with Renewable and Privacy Preserving Binary Templates" IEEE, 2005, pp. 1-6.*

(Continued)

*Primary Examiner* — Shewaye Gelagay
(74) *Attorney, Agent, or Firm* — Finnegan, Henderson, Farabow, Garrett & Dunner, L.L.P.

(57) ABSTRACT

A biometric user authentication method, includes enrolling a user based on user's biometric samples to generate user's reference data; and authenticating the user based on a user's live biometric sample and the user's reference data; wherein enrolling a user includes acquiring the user's biometric samples; extracting an enrollment feature vector from each user's biometric sample; computing a biometric reference template vector as a mean vector based on the enrollment feature vectors; computing a variation vector based on the enrollment feature vectors and the mean vector; randomly generating an enrollment secret vector; computing an enrollment code vector based on the enrollment secret vector and the variation vector; computing a difference vector as a wrap-around difference between the enrollment code vector and the mean vector; computing an error correction vector based on the enrollment secret vector to enable error correction during the user authentication phase according to a given error tolerance level, wherein the error correction vector is not computed if the error tolerance level is equal to zero; and storing the variation vector, the difference vector, and the error correction vector as a part of the user's reference data to be used during the user authentication phase.

16 Claims, 2 Drawing Sheets

OTHER PUBLICATIONS

Adler, A., "Images Can Be Regenerated From Quantized Biometric Match Score Data", Proceedings of Canadian Conference on Electrical and Computer Engineering, pp. 1163-1116, (2004).

Davida, G. I., et al., "On Enabling Secure Applications Through Off-line Biometric Identification", Proceedings IEEE Symposium on Security and Privacy, 148-157, (1998).

Jin, L. et al., "A Novel Adaptive Image Enhancement Algorithm for Face Detection,", Proceedings of the 17$^{th}$ International Conference on Pattern Recognition (ICPR '04), pp. 843-848, (2004).

Davida, G. I. et al., "On the relation of error correction and cryptography to an off line biometric based identification scheme", Proceedings Workshop Coding and Cryptography, pp. 1-10, (1998).

Viola, P. et al., "Rapid Object Detection using a Boosted Cascade of Simple Features", Accepted Conference on Computer Vision and Pattern Recognition 2001, (IEEE CVPR'01), vol. 1, pp. 1-9, (2001).

Lienhart, R. et al., "An Extended Set of Haar-like Features for Rapid Object Detection", IEEE Proceedings of ICIP 2002, vol. 1, pp. 900-903, (2002).

Papageorgiou, C. et al., "A General Framework for Object Detection", Proceedings of International Conference on Computer Vision, pp. 555-562, (1998).

Yuille, A. et al., "Image Warping for Shape Recovery and Recognition", Computer Vision and Image Understanding, vol. 72, pp. 1-22, (1998).

Tankus, A. et al., "Convexity-based Visual Camouflage Breaking", Computer Vision and Image Understanding, vol. 82, No. 3, pp. 1-37, (2001).

Tankus, A. et al., "Face Detection by Direct Convexity Estimation", Pattern Recognition Letters, vol. 18(9), pp. 913-922, (1997).

Spies, H. et al., "Face Recognition in Fourier Space", Proceedings of Vision Interface (VI 2000), pp. 38-44, (2000).

Rivest, R.L., "The MD5 Message-Digest Algorithm", MIT Laboratory for Computer Science and RSA Data Security, Inc., Network Working Group Request for Comments: 1321, pp. 1-21, (1992).

"Secure Hash Standard", Federal Information Processing Standards Publication 180-2, pp. i-iv and 1-71, (2002).

Wang, X., et al. "How to Break MD5 and Other Hash Functions", Proceedings of Eurocrypt 2005, Lecture Notes in Computer Science, vol. 3494, pp. 19-35, (2005).

Wang, X. et al., "Finding Collisions in the Full SHA-1", Proceedings of Crypto 2005, Lecture Notes in Computer Science, vol. 3621, pp. 17-36., (2005).

Cheng, Y. et al., "Protecting Face Biometric Data on Smartcard With Reed-Solomon Code", Proceedings of the 2006 Conference on Computer Vision and Pattern Recognition Workshop, Conference on New York, IEEE, 6 pages, (2006).

Uludag, U. et al., "Biometric Cryptosystems: Issues and Challenges", XP-11112757, Proceedings of the IEEE, vol. 92, No. 6, pp. 948-960, (2004).

* cited by examiner

METHOD AND SYSTEM FOR BIOMETRIC AUTHENTICATION AND ENCRYPTION

CROSS REFERENCE TO RELATED APPLICATION

This application is a national phase application based on PCT/EP2006/012562, filed Dec. 28, 2006.

TECHNICAL FIELD OF THE INVENTION

The present invention relates in general to biometric user authentication and to biometric encryption key generation.

BACKGROUND ART

Biometric encryption is commonly related to the generation/extraction of a secret value, commonly referred to as biometric key, from user biometric data (e.g., fingerprint, iris or retina eye scan, voice, face image). Such biometric key can subsequently be used for cryptographic applications such as user authentication and message authentication and encryption, either directly, as an encryption key, or as an input to more complex key generation algorithms.

A traditional user biometric authentication typically comprises two phases: an enrollment phase and an authentication phase. During the enrollment phase, a biometric reference template is created from a training set of biometric samples obtained from the user. Different enrollments generally give rise to different biometric reference templates. During the authentication phase, a live biometric sample of the same user is compared with the biometric reference template by using a measure of statistical closeness (similarity) between the live biometric sample and the stored biometric reference template. If the live biometric sample and the stored reference template are deemed sufficiently similar, then the authentication phase is considered successful.

In many current traditional biometric systems, the user biometric reference templates are stored in a database, out of users' control, and are often transmitted over unsecured network connections. This situation is probably due to the fact that biometric reference templates were considered to be non-invertible, meaning that it was thought that no information about the original biometric sample can be learned from a derived or transformed biometric reference template. However, recently A. Adler in "*Images can be generated from quantized biometric match score data*," Proceedings of Canadian Conference on Electrical and Computer Engineering, pp. 1163-1166, 2004, has demonstrated that biometric reference templates may be inverted, showing that good images of original biometric samples can be obtained from biometric reference templates if some additional data such as the match scores are also available.

In the case of biometric encryption systems, the traditional biometric reference template is not stored at all. Instead, some auxiliary data derived from the user's biometric sample is stored, and this data should not be vulnerable the same way as the traditional reference templates are (i.e., should be non-invertible and should not reveal any essential information about the original biometric reference template). In the enrollment phase, the auxiliary data and an encryption key are derived from a training set of biometric samples obtained from the user and, in the case of randomization, from additional random data. The auxiliary data is stored. During the authentication phase, the encryption key can be reconstructed from a live user biometric sample and the corresponding auxiliary data. If the encryption key is the same as the one obtained during the enrollment phase, then the authentication is deemed successful.

Several biometric encryption algorithms that provide some form of protection of the biometric reference templates have been proposed in scientific and patent literature.

For example, U.S. Pat. No. 6,219,794 discloses a method for secure key management using a biometric, and in particular a secure method for consistently reproducing a digital key using a biometric, such as a fingerprint. The digital key is linked to the biometric only through a secure block of data, known as the protected filter. The key cannot be released from the protected filter other than via the interaction with the correct biometric image. Once generated, the digital key may then be used in a system as an encryption/decryption key or as a personal identification number (PIN).

A biometric encryption method based on iris biometric data is proposed by G. I. Davida, Y. Frankel, and B. J. Matt in "*On enabling secure applications through off-line biometric identification*," Proceedings IEEE Symposium on Security and Privacy, pp. 148-157, 1998, and by G. I. Davida, Y. Frankel, B. J. Matt, and R. Peralta in "*On the relation of error correction and cryptography to an off-line biometric based identification scheme*," Proceedings Workshop Coding and Cryptography, pp. 129-138, 1999. The method uses the technique of linear error-correcting codes applied to biometric reference templates, whereas the required error tolerance between the live biometric samples and biometric reference templates is provided by the error-correction capability of the codes used.

An alternative method to that proposed by Davida et al. is disclosed in WO00/51244, where a new type of cryptographic primitive, referred to as a fuzzy commitment scheme, is achieved by combining techniques from the areas of error-correcting codes and cryptography. Like a conventional cryptographic commitment scheme, a fuzzy commitment scheme is both concealing and binding: it is infeasible for an attacker to learn the committed value, and also for the committer to decommit a value in more than one way. The scheme is fuzzy in the sense that it accepts a witness that is close to the original encrypting witness in a suitable metric, but not necessarily identical. This characteristic of a fuzzy commitment scheme makes it particularly useful for applications such as biometric authentication systems, in which data is subject to random noise. Because the scheme is tolerant of errors, it is capable of protecting biometric data just as conventional cryptographic techniques, like hash functions, are used to protect alphanumeric passwords.

A fuzzy commitment scheme includes mapping an input pattern derived from biometric data to a first codeword selected from the plurality of codewords associated with an error-correcting code, calculating an offset between the input pattern and the first codeword, and hashing the first codeword. The offset is stored as auxiliary data, and a biometric key is derived from hash of the first codeword. The hash of the first codeword together with the offset form a fuzzy commitment. If an input pattern is derived from a live biometric sample, which is close, but not identical to the original biometric data used to generate the offset, then the input pattern is first translated by using the same offset and, then, the first codeword is reconstructed by applying a decoding function of the code to the translated input pattern.

A method of using biometric information for secret generation is disclosed in WO02078249, where a secret is generated from individual's biometric information, such as voice, handwriting, and fingerprint. In particular, a feature vector is extracted from the captured biometric data, the feature vector is then transformed into a codeword, and the codeword is used to construct the secret. A one-way hash of the secret is stored. Only if a user generates a new secret that has the same hash value as that stored will the user be confirmed. To keep pace with the gradual change of the measured biometric features, the secret can be updated adaptively. The secret may be an encryption key.

OBJECTIVE AND SUMMARY OF THE INVENTION

The Applicant has noted that although the methods described above provide some security arguments, the practical security of protection of the reference biometric template remains unclear and some solutions do not appear to be secure.

In particular, with reference to U.S. Pat. No. 6,219,794, the Applicant has noted that it is specifically adapted to deal with simple image-based biometric data, and that the security arguments are not clear and convincing.

With reference to the iris-based encryption method proposed by Davida et al., the Applicant has noted that the main feature of this method is that the K-bit biometric template is not stored in the database, but only the N-K check bits, and the authors admit that the check bits reveal N-K bits of information about the original biometric template. So, N-K has to be relatively small, and this means that the number of errors T that could be corrected, i.e., the error tolerance is also small. For this reason, the proposed method uses multiple iris scans (feature vectors), in order to effectively reduce the number of errors by majority decoding, both in the enrollment and authentication phase, which considerably slows down the process. The Applicant observes that the majority decoding can work well only if the errors in multiple iris scans are not correlated, but this is not likely to happen. Another drawback found by the Applicant is that the derived biometric encryption keys are practically fixed and as such cannot be revoked and reissued.

With reference to WO00/51244, the Applicant has noted that the security of this method is only analyzed in the fuzzy commitment framework. However, for its biometric security, it is required to analyze the amount of information about user a biometric template vector contained in a stored difference (offset) vector, which is computed as a difference between user biometric template vector and a codeword, and also, more generally, to analyze if the user biometric template vectors can be reconstructed from a set of difference vectors coming from different enrollments, and this analysis is not done by the authors. Additionally, the Applicant has noted that the biometric security of this method depends on the choice of the error correcting code, and that for some codes this method is not secure, because the stored difference vectors from different enrollments leak out considerable information about the original biometric template, which may also lead to their total or partial reconstruction. Another drawback found by the Applicant is that in higher dimensions of the feature vectors, which appear in practice, the probability of not reconstructing the original codeword (i.e., the probability of missing the event or false rejection probability) would be unacceptably high if the fuzzy commitment scheme is applied to individual feature coordinates, as suggested in WO00/51244.

The same criticism also applies to the method proposed in WO02078249.

With regard in general to biometric reference templates, the Applicant has also noted that there could be two categories of problems related to the intrinsic lifetime nature thereof: a privacy problem and an identity theft problem. Namely, biometric data contain unique information about a person and people fear that, even if stored in a transformed (e.g., compressed) form, compromised biometric data may disclose other sensitive personal data (like race, sex, health condition, etc.). Also, compromised biometric data are inherently difficult to change or revoke.

Further, the Applicant has noted that known encryption methods attempt to address the issue of how biometric-based encryption key schemes should handle the variability in the biometric samples, which variability can be due to several factors, which can be grouped in the following three categories:

inconsistent presentation of the biometric trait: the signal acquired by a sensor depends upon both the intrinsic characteristics of the biometric trait and the way it is presented to the sensor. Thus, an acquired biometric signal is a non-deterministic composition of the physiological trait, the user behavior, and the user interaction facilitated by the acquisition interface. For example, in the case of face biometrics, different acquired signals may contain different poses of a face;

irreproducible presentation of the biometric trait: unlike synthetic identifiers (e.g., RFID chips, smart cards, etc.), biometric traits are prone to natural changes, accidental injuries, malfunctions, and pathological development. For example, manual work, dirt, or accidents can change the ridge structure of a finger, facial hair growth, accidents, attachments (eyeglasses, jewelry), makeup, swellings, and different hairstyles may all contribute to irreproducible face depictions, the common cold changes a person's voice, etc; and imperfect signal representation or/and acquisition: the acquisition conditions in practical situations can cause extraneous variations in the acquired signal, and, hence, can induce unpredictable variability in the biometric representation. For example, different illuminations cause conspicuous differences in the facial appearance.

As a result of these complex variations in the biometric signal, the biometric samples can vary, sometimes dramatically, from one acquisition to another.

The Applicant has found that, to deal with privacy and identity theft concerns, it is desirable to provide a provably secure method for biometric authentication and biometric encryption key generation in which biometric reference templates are protected in such a way that the stored data do not reveal any essential information about the original biometric data, and in which the encryption key generated by using the proposed method is uniquely linked to the individual, despite the variations in the biometric data.

The objective of the present invention is therefore to provide a biometric user authentication method and system, and a biometric encryption key generation method and system, which meet the afore-mentioned needs.

This objective is achieved by the present invention in that it relates to a biometric user authentication method and system, and to a biometric encryption key generation method and system, as claimed in the appended claims.

In broad outline, the biometric user authentication and biometric encryption key generation method according to the present invention is essentially based on the fact that biometric reference templates are neither used nor stored in their original form. Instead, they are used in a randomized form and not stored, but can uniquely be recovered from stored auxiliary information and a live user biometric sample. A randomized biometric reference template is irreversibly transformed by applying a cryptographic hash function and then stored and used for the user authentication. As the stored auxiliary information does not reveal essential information about the original biometric data, this solves the privacy concerns typical of biometric authentication systems. The secret encryption key is derived from the randomized biometric reference template and possibly some other user-specific information, such as a user identifier, a PIN, etc., by applying a key derivation function, which can also be based on a cryptographic hash function. Due to randomization, the secret encryption key is inherently variable and as such easily revocable and changeable.

More in particular, in the biometric user authentication and biometric encryption key generation method according to the present invention the biometric data is represented by analog (real-valued, integer-valued, or rational-valued) feature vectors whose coordinates are considered to be close with respect to the absolute difference of real numbers as a distance measure. Similarly, two-analog vectors as a whole are considered to be close with respect to the Euclidean distance. The Euclidean distance between analog feature vectors generally appears to be more appropriate for biometric applications than the Hamming distance between binary feature vectors, due to the analog nature of measurements. The biometric user authentication and biometric encryption key generation method according to the present invention is generally applicable to any feature vectors of this type and in particular to biometric data coming from fingerprint images, iris or retina eye scan images, face images, and voice signals.

The biometric user authentication and biometric encryption key generation method according to the present invention provides the following advantages:

facilitates the design of biometric encryption systems resistant to identity theft attacks: even if the stored auxiliary biometric reference template is compromised, the original biometric reference template is neither compromised nor lost forever and new biometric keys can continue to be issued;

facilitates the biometric encryption key revocation and renewal: if the biometric encryption key is compromised (e.g., through cryptographic applications), then the biometric data is not affected, so that the biometric encryption key can be revoked and reissued as easily as before;

helps to preserve privacy: the stored auxiliary biometric reference template does not lead to the original biometric data even if compromised, and different applications can use different biometric encryption keys (even if they are derived from the same biometric user reference template);

helps to implement a secure and convenient encryption key management system: unique biometric encryption keys are generated directly from biometric samples and are not stored in the original form.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited to the embodiments shown, but is to be accorded the widest scope consistent with the principles and features disclosed herein and defined in the attached claims.

Moreover, for the sake of simplicity, a biometric encryption system according to the present invention, which will now be described with reference to biometric data coming from face images, can be logically divided into two sub-systems: an enrollment sub-system configured to implement an enrollment procedure, and an authentication sub-system configured to implement an authentication procedure. The enrollment and authentication sub-systems each generates a secret value from the user's facial data, but they fundamentally differ in purpose: the aim of the enrollment sub-system is the creation of a unique user identifier, while the aim of the authentication sub-system is the user identity verification by means of the re-creation of the same unique user identifier. Subsequently, the identifier can be used to perform cryptographic operations on behalf of the user.

Figure 1:
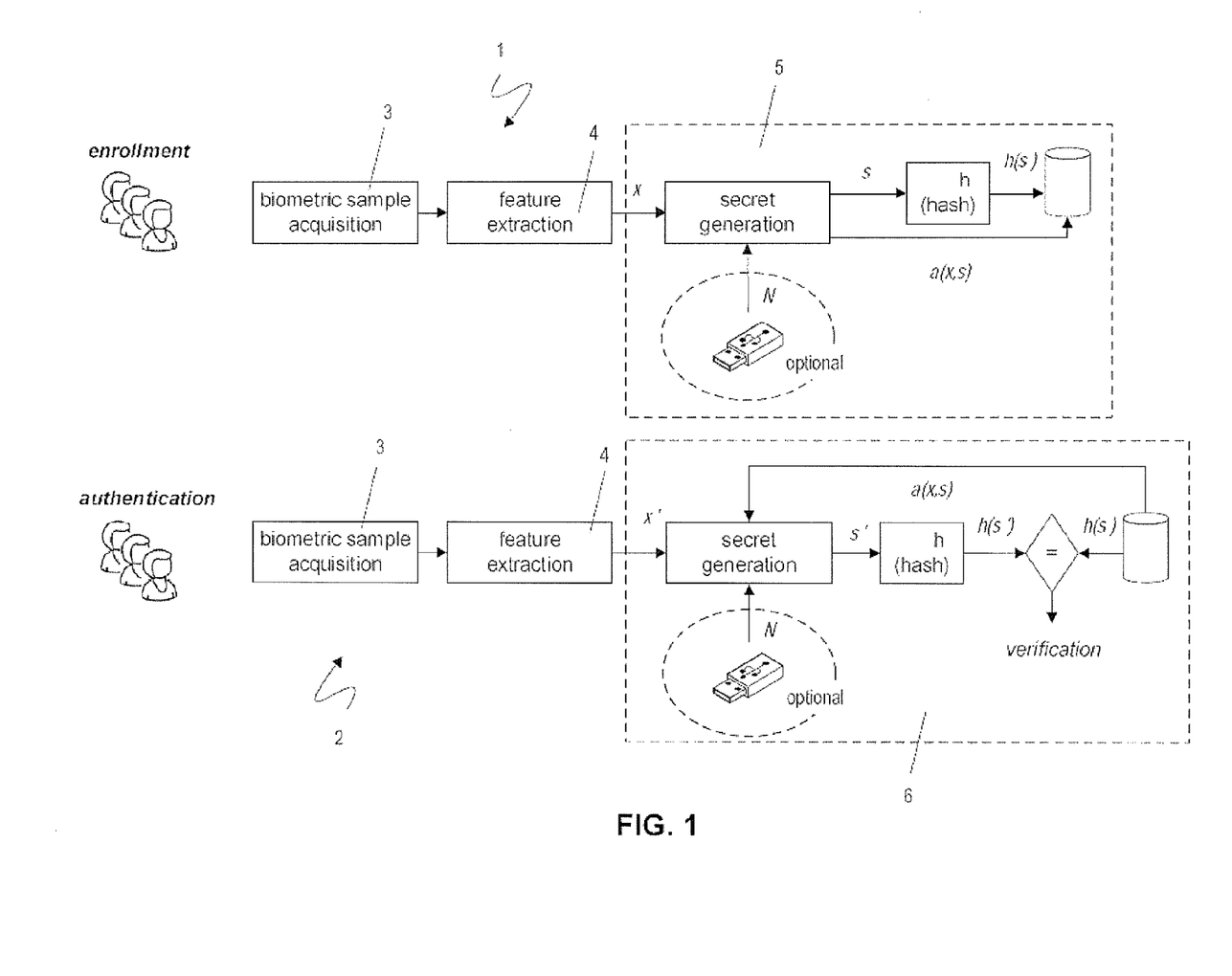
FIG. 1 shows a generic biometric user enrollment and authentication system.

FIG. 1 shows a block diagram of the enrollment and authentication sub-systems, which are made up of several modules, some of which are in common between the two sub-systems and are used during both enrollment and verification.

In particular, the enrollment and authentication sub-systems, designed respectively by 1 and 2, each comprises:

a biometric sample acquisition module 3 configured to acquire biometric sample images (i.e., face images);

a feature extraction module 4 configured to generate feature vectors from the biometric sample face images;

an enrollment module 5 configured to generate and store data necessary for biometric user authentication and biometric encryption key generation; and an authentication module 6 configured to authenticate the user and generate the encryption key.

The biometric sample acquisition module 3 supports multiple inputs, such as a live captured video, and a saved video or multiple images of the user's biometric sample (either live or saved images). The live video or images of the user's face can be captured by any video camera, such as a common webcam, a digital PDA, a cellular camera, etc. Any software that controls the interface with the video camera and the video acquisition can be used, e.g., the Intel Open Source Image Processing and Computer Vision library OpenCV. In a preferred embodiment, the biometric sample acquisition module 3 also performs liveness detection.

The feature extraction module 4 generates the feature vectors from the acquired biometric sample face images provided by the biometric sample acquisition module 3. It provides several functionalities, including preliminary functionalities that are related to face detection and extraction and image processing (i.e., image normalization), while the core functionality of the feature extraction module 4 is the feature extraction algorithm.

In particular, as far as face detection and extraction functionality is concerned, face detection is performed on each acquired video frame, so providing variable size image frames depicting user's face with little background. This phase is also necessary for rejecting inappropriate frames, i.e., frames that do not contain a face. The algorithm used for face detection implements a machine learning approach for visual object detection for example described in P. Viola and M. Jones, "*Rapid object detection using a boosted cascade of*

*simple features*," IEEE CVPR '01, vol. 1, p. 511, 2001, based on the application of Haar filters for example described in R. Lienhart and J. Maydt, "*An extended set of Haar-like features for rapid object detection*," in IEEE Proceedings of ICIP 2002, vol. 1, pp. 900-903, 2002, and the AdaBoost algorithm for example described in C. Papargeorgiou, M. Oren, and T. Poggio, "*A general framework for object detection*," Proceedings of International Conference on Computer Vision, p. 555, 1998.

As far as face image normalization functionality is concerned, the biometric encryption method according to the present invention works with features extracted from black and white images, by performing the following operations:

image conversion from RGB color space to intensity values, also known as gray levels;

two-dimensional warping of intensity images to mitigate small three-dimensional geometric changes of the faces, due to different poses of the user's head. The base points, also known as features, of the source image are extracted, feature correspondence with a generic face model is computed, and the warping is performed to produce a target frontal image of the user's face. Feature correspondence is used to obtain the mapping functions that define the spatial relationships between all points in both images. These mapping functions are known as warp functions and are used to interpolate the positions of the features. The warping algorithm uses points and line segments to determine feature positions in the images (basically, eyes position and mouth position), as described for example in A. Yuille, M. Ferraro, and T. Zhang, "*Image warping for shape recovery and recognition*," Computer Vision and Image Understanding, vol. 72, pp. 351-359, 1998. Alternatively, this functionality may provide invariance to translation, rotation, and scaling, e.g., by using the Fourier-Mellin transform; and intensity transformation, meant to produce an image enhancement. An adaptive image enhancement technique and a light direction compensation algorithm may for example be implemented as described in L. Jin, S. Satoh, and M. Sakauchi, "*A novel adaptive image enhancement algorithm for face detection*," Proceedings of the 17th International Conference on Pattern Recognition (ICPR '04), pp. 843-848, 2004, Ariel Tankus and Yehezkel Yeshurun, "*Convexity-based visual camouflage breaking, Computer Vision and Image Understanding*," vol. 82, no 3, pp. 208-237, June, 2001, and Ariel Tankus, Yehezkel Yeshurun, and Nathan Intrator, "*Face detection by direct convexity estimation*," Pattern Recognition Letters, vol. 18(9), pp. 913-922, 1997.

As far as feature extraction functionality is concerned, the biometric encryption method according to the present invention can work with different sets of features extracted from normalized images. Even if the use of only one of such features sets will be described hereinafter, other sets can be used as far as they are univocal and hence discriminatory enough for user recognition. The aim of the feature extraction is to transform each facial normalized image into a vector in $R^d$, where the number d represents the vector dimension and varies from one feature extraction method to another. The present approach for feature extraction is the bi-dimensional Fourier transform of the gray-level facial images, which produces a Fourier feature set. Fundamentally, coefficients of the bi-dimensional Fourier transform of the gray-level face images described in H. Spies and I. Ricketts, "*Face recognition in Fourier space*," Proceedings of Vision Interface (VI 2000), Montreal, Canada, pp. 38-44, May 2000, are used as biometric features. If f is an M×N image and $f_{x,y}$ is an intensity value of a point (x,y), then the Fourier transform applied to the entire image gives:

$$F(u,v) = \sum_{y=0}^{M-1}\sum_{x=0}^{N-1} f_{x,y} e^{2\pi j(\frac{xu}{N}+\frac{yv}{M})}, j^2 = -1$$

where (u,v) are frequency domain coordinates.

Figures 2, 3:
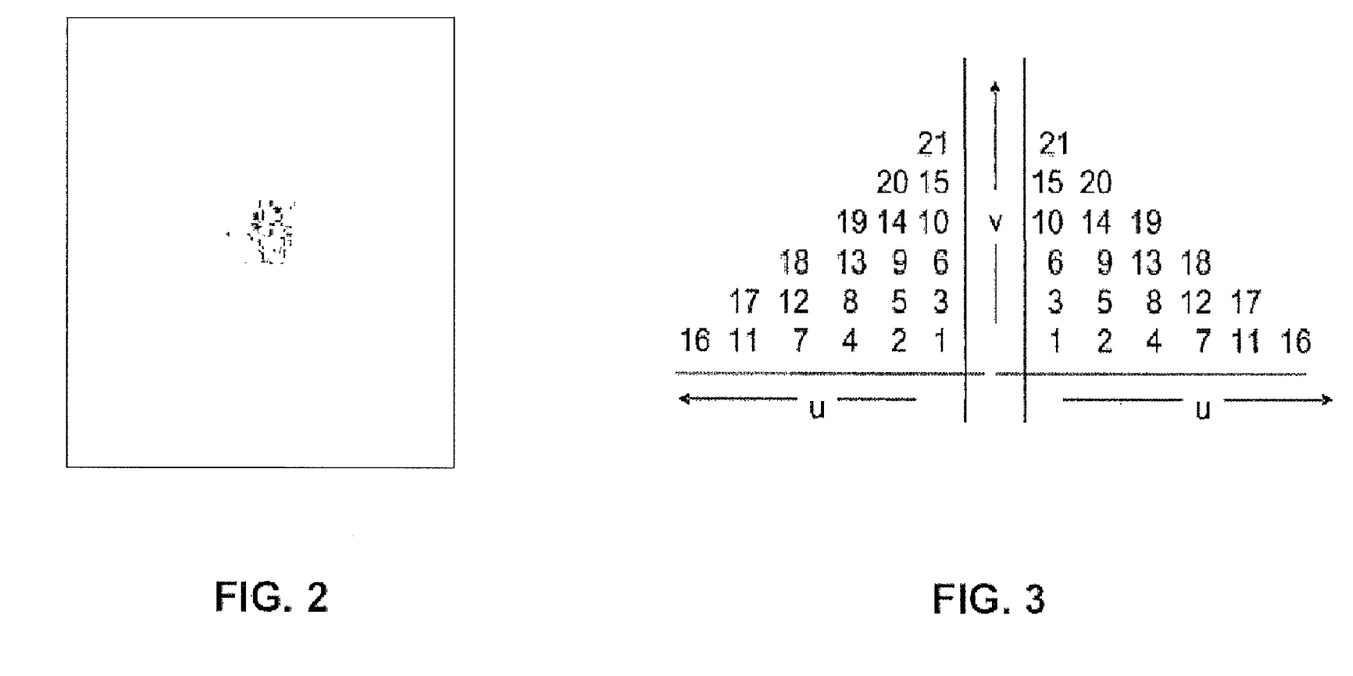
FIG. 2 shows a Fourier spectrum of a gray-level face image.
FIG. 3 shows a low frequencies selection criterion.

FIG. 2 shows the Fourier spectrum of a gray-level face image. It may be appreciated that the Fourier spectrum is concentrated around the origin (the center of the image), in a rhombus-like shaped region. Because of the symmetry of the Fourier spectra of real face images, it is sufficient to consider two quadrants of the spectrum, e.g., the upper right and left quadrants. The frequencies are selected in a way shown in FIG. 3, where u and v are the frequency domain coordinates.

The feature vector is composed of the most significant frequencies, i.e., the low frequencies. The Applicant has experimentally determined that the first 21 frequencies of the Fourier spectrum contain up to 90% of the energy of a facial image, and, hence, most of the information. The low frequencies also contain the distinguishing information, as they are the frequencies that vary the most from one user to another. In an aspect of the present invention, the Fourier feature vector can contain the concatenation of the real and imaginary parts of the coefficients of the first 21 lowest spatial frequencies of the spectra, except for the imaginary parts of the corner components designated with number 1 in FIG. 3, thus forming feature vectors of d=82 components.

Other methods can also be used for extracting the features, but the Applicant has experienced that Fourier-based features (both Fourier-Mellin and simple Fourier) perform well, with a relatively low computational complexity.

The enrollment module 5 is configured to process the feature vectors obtained after biometric sample acquisition and feature extraction so as to generate and store all data necessary for user authentication and encryption key generation.

The enrollment module takes as an input a set of feature vectors:

$$X^{tr} = \{x_j: 1 \leq j \leq t\}$$

commonly referred to as a training set, generated during the feature extraction from a corresponding set of user biometric samples generated by the biometric sample acquisition module 3. For example, in the case of facial images, the training set may include around t=50 feature vectors, each of dimension d=82. The feature vectors are assumed to be real-valued, that is $$x_j \in R^d, 1 \leq j \leq t,$$

where R denotes the set of real numbers. Hence $X^{tr} \subseteq R^d$. In practice, the real numbers are approximated as finite precision integers or rational numbers, and are hence defined by a limited number of bits in the corresponding binary representation.

The starting assumption is that the feature vectors $$x_j = (x_{j,1}, \ldots, x_{j,i}, \ldots, x_{j,d})$$

resulting from the same person are mutually close in each coordinate, where the closeness is measured as the absolute value of the difference of real numbers. Accordingly, in the user authentication system of the present invention, all the feature vectors $x' = (x'_1, \ldots, x'_i, \ldots, x'_d) \in R^d$ satisfying the following condition:

$$|x'_i - x_i| < r_i, 1 \leq i \leq d \qquad (1)$$

will be effectively classified as coming from the same person, where $x=(x_1, \ldots, x_i, \ldots, x_d)$ is a biometric reference template vector, and $r=(r_1, \ldots, r_i, \ldots, r_d)$ is a radius vector, $r_i$ being the radius associated with the i-th coordinate of x.

The biometric reference template vector can be estimated as the (arithmetic) mean value over the training set $X^{tr}$, that is:

$$x_i = \frac{1}{t} \sum_{j=1}^{t} x_{j,i}, 1 \le i \le d, \quad (2)$$

and the radius vector can be estimated as the standard deviation vector $r_i$ multiplied by a positive constant c, that is:

$$r_i = c \cdot \sqrt{\frac{1}{t-1} \sum_{j=1}^{t} (x_{j,i} - x_i)^2}, 1 \le i \le d. \quad (3)$$

The set of all the feature vectors $x' \in R^d$ satisfying equation (1) is generally referred to as user identifier region H corresponding to a given person. The constant c determines the false rejection probability and, for example, can be chosen from the interval [1,2].

In practice, if the dimension d of a feature vector is relatively large, then the false rejection probability may become unacceptably high. In this case, the user identifier region is effectively enlarged to include all the feature vectors that satisfy equation (1) with a tolerated exception of at most e coordinates. The parameter e is generally referred to as error tolerance level, and has to be large enough for the false rejection probability to be acceptably low and yet small enough for the average false acceptance probability to be acceptably low. The false rejection probability can be estimated for given c and e, under the normal distribution assumption, while the empirical estimation of the false acceptance probability is more difficult and requires the training sets for a sufficiently large number of persons to be available. Typically, for user authentication purposes, only the false rejection probability estimate may suffice, while for user identification purposes, an estimate of the false acceptance probability may also be required. The following table contains the values of the false rejection probability depending on various values of c and the error tolerance level e, for d=82.

|  | e = 5 | e = 6 | e = 7 | e = 8 | E = 9 | e = 10 |
|---|---|---|---|---|---|---|
| c = 1 | 1 | 1 | 0.999999 | 0.999997 | 0.99999 | 0.999964 |
| c = 2 | 0.170033 | 0.0798101 | 0.0331152 | 0.0122473 | 0.00406821 | 0.001222 |
| c = 3 | 1.13744e-07 | 3.32949e-09 | 8.42341e-11 | 1.87239e-12 | 3.91909e-14 | 2.9976e-15 |

In practice, the coordinates of a feature vector can be represented by n-bit integers taking values in the set $[0, 2^n-1]$, where the number of bits n in the binary representation may depend on the individual coordinate. This can be achieved by an appropriate normalization, that is, multiplication by a constant and addition of another constant. Consequently, it is assumed that the i-th coordinate is represented by an $n_i$-bit integer, and that $n_i$ should be large enough to encompass with a high probability the variation over different users and yet approximately minimized for the storage requirements to be kept at a reasonable level.

Instead of the radius vector, it will be convenient to work with the diameter vector $q=(q_1, \ldots, q_i, \ldots, q_d)$ whose coordinates are defined as the doubled coordinates of the radius vector, i.e., $q_i=2r_i$. The diameter vector will also be referred to as the variation vector. It is further assumed that $q_i$ is represented by an $m_i$-bit integer, where typically $m_i$ is much smaller than $n_i$. Recall that $q_i$ is the length of the interval around the mean value $x_i$ that encompasses with a high probability the variation of the i-th coordinate of the feature vector over a fixed user. Accordingly, $n_i$ and $m_i$ are the same for all the users and the equations $x_i \in [0, 2^{n_i}-1]$ and $q_i \in [0, 2^{m_i}-1]$ both hold with a high probability for almost all the users of the system.

Up to this point, in the initial phase of the enrollment procedure, the biometric reference template vector x, the radius vector r, and the diameter vector q have been computed for a given user. The information about the user contained in the biometric reference template vector x is considered to be essential or significant, whereas the information contained in the radius vector r or the diameter vector q is far less relevant. Moreover, in some applications, the radius vector r may be fixed and as such does not contain any information about individual users. Therefore, our primary objective is to avoid storing the biometric reference template vector x in a database, while the radius vector r or the diameter vector q is allowed to be stored.

To this end, the paradigm introduced in the previously mentioned WO00/51244 is herein adopted and thus an appropriate error correcting code adapted to is deal with bounded real or integer numbers is introduced. Let $$M_i = \left\lceil \frac{2^{n_i} - 1}{q_i} \right\rceil, \quad (4)$$

where $\lceil a \rceil$ and $\lfloor a \rfloor$ denote the minimal and maximal integers not smaller than and not bigger than a given real number a, respectively, and let $$z_{i,s_i} = s_i \cdot q_i + \frac{q_i}{2}, 0 \le s_i \le M_i - 1, \quad (5)$$

denote the $M_i$ codewords of the corresponding one-dimensional Euclidean error correcting code with the minimal (one-dimensional) Euclidean distance between the codewords equal to $q_i$. Here, each codeword is defined by an integer $s_i$. Consequently, the error correction radius of this code is equal to $q_i/2$, which means that if a codeword is changed by less than $q_i/2$, then it can be correctly recovered by the minimum distance decoding. Equation (4) guarantees that $M_i \cdot q_i \ge 2^{n_i}-1$, which means that the codewords effectively cover the whole range for the i-th coordinate of the feature vector. For this code, there exists a fast minimum distance decoding algorithm, which consists of dividing any real or integer number $z_i$ from the segment $[0, M_i \cdot q_i]$ by $q_i$ and then computing the integer part, i.e., $\lfloor z_i/q_i \rfloor$. Namely, if $s_i = \lfloor z_i/q_i \rfloor$, then $z_{i,s_i}$ is the nearest codeword to $z_i$, which is unique if $z_i/q_i$ is not an integer. If both $z_i$ and $q_i$ are integers, then $\lfloor z_i/q_i \rfloor$ can be efficiently computed by the Euclidean algorithm.

The integer $s_i$, which can be represented by $k_i = \lceil \log M_i \rceil$ bits, thus represents the information bits, which uniquely determine a codeword. Since $q_i$ depends on a particular enrollment, so thus $M_i$ and $k_i = \lceil \log M_i \rceil$. In practice, instead of choosing $M_i$ codewords, it may be convenient to choose the maximum number $2^{k_i}$ of codewords, given $k_i$. Note that as $2^{k_i} \geq M_i$, then $2^{k_i} \cdot q_i \geq 2^{n_i} - 1$, so that the whole range is then also covered with the codewords. In this case, it is easier to implement a random choice of the codewords according to the uniform distribution. More precisely, it then suffices to randomly choose $k_i$ information bits, according to the uniform distribution. For simplicity, the enrollment algorithm will be described in these terms. Note that it follows that $k_i \geq n_i - m_i$.

In practice, it may also be desirable to make the number $k_i$ of bits representing $s_i$ fixed, i.e., independent of users and enrollment. Hence, the following equation $$k_i \geq \lceil \log M_i \rceil = \left\lceil \log \left\lceil \frac{2^{n_i}-1}{q_i} \right\rceil \right\rceil \quad (6)$$

is to be satisfied for all $q_i$ that may appear in the system with a high probability. This means that $k_i$ is effectively determined by the minimum expected value of $q_i$ over all the users in the system, and if $q_i$ is somewhat smaller than $2^{m_i} - 1$, then $k_i$ is somewhat larger than $n_i - m_i$. As a consequence, in this case each codeword is represented by $k_i + m_i$ bits, which is somewhat larger than $n_i$. If we choose to work with $2^{k_i}$ instead of $M_i$ codewords, then $M_i$ need not be computed at all.

After the initial phase, the enrollment procedure comprises the following four steps:

1) For each $1 \leq i \leq d$, an integer $s_i$ is randomly chosen by generating $k_i$ bits uniformly at random, the corresponding codeword $z_i = s_i \cdot q_i + q_i/2$ is computed, and then the auxiliary difference value is computed by using a wrap-around subtraction:

$$w_i = (z_i - x_i)_{wrap} = \begin{cases} z_i - x_i, & z_i \geq x_i \\ z_i - x_i + 2^{k_i} q_i, & z_i < x_i. \end{cases} \quad (7)$$

If $w=(w_1, \ldots, w_d)$ and $z=(z_1, \ldots, z_d)$, then equation (7) can be written in a vectorial form as $w=(z-x)_{wrap}$. From $z_i, x_i \in [0, 2^{k_i}q_i]$ it follows that $w_i \in [0, 2^{k_i}q_i]$. The difference values $w=(w_1, \ldots, w_d)$ are stored as auxiliary data, together with the diameter vector q, for the reconstruction of the d blocks of bits contained in the vector $s=(s_1, \ldots, s_d)$. For simplicity, we also use the notation $a(x,s)$ for the auxiliary data $(w,q)$, which depends on s and the user biometric data x and q.

2) In order to enable error correction in the authentication process according to an assumed error tolerance level e, the d blocks of bits contained in $s=(s_1, \ldots, s_d)$ are transformed, as information blocks, into 2e parity blocks $p=(p_1, \ldots, p_{2e})$ by using a burst-error correcting code capable of correcting any e erroneous blocks by a fast decoding algorithm such as a Reed-Solomon code.

For example, for facial biometric data with d=82, e=8 may suffice (see the previous table for c=2). To this end, each of d blocks should be extended by fixed dummy bits to an equal length k ($k \geq k_i$, $1 \leq i \leq d$), in which case the parity blocks also have length k. (Alternatively, by deleting the most significant bits one can reduce them to an equal length k ($k \leq k_i$, $1 \leq i \leq d$), but in this case the security with respect to collisions is reduced.) The parity blocks p are stored as auxiliary data for the error correction. These 2e parity blocks reveal or leak information about the information blocks in that any subset of 2e information blocks are uniquely determined by the parity blocks and the remaining information blocks. It is hence necessary that d>2e.

3) The vector $s=(s_1, \ldots, s_d)$ is transformed by a cryptographic hash function h, such as SHA-256, into the user verification data h(s). This function should be one-way (i.e., it should be computationally infeasible to find an input yielding any given output) and collision resistant (i.e., it should be computationally infeasible to find any two inputs yielding the same output). Its input can also include user-specific information such as personal data, passwords, and PINs. The user verification data h(s) is stored.

4) Due to the information leaked out by the parity blocks, any subset of 2e blocks with the largest bit lengths are removed from $s=(s_1, \ldots, s_d)$ to obtain a reduced vector $\hat{s} = (\hat{s}_1, \ldots, \hat{s}_{d-2e})$, which is hence uniformly distributed even if the parity blocks are assumed to be known. If the parity blocks are obtained from reduced length blocks $s_i$, then one can remove any subset of 2e blocks. Then a secret key S (biometric key) can be produced by applying a (cryptographic) key derivation function $F_{keyder}$ to the reduced vector $\hat{s} = (\hat{s}_1, \ldots, \hat{s}_{d-2e})$, that is:

$$S = F_{keyder}(\hat{s}) \quad (8)$$

This function should be a one-way function. Preferably, this function should be also collision resistant and pseudorandom (i.e., its output should be computationally indistinguishable from a random value). Its input can also include user-specific information such as personal data, passwords, and PINs. The secret key S is not stored, but can be produced whenever needed.

To summarize, the enrollment procedure thus produces and stores the user reference data containing (q, w, p, h(s)), whereas the biometric (cryptographic) key S can be produced from s if needed, but is not stored for security reasons.

The authentication module 6 is configured to acquire, during the authentication procedure, a live biometric user sample, and to generate one or more test feature vectors. Let $X^{test} = \{x'_j : 1 \leq j \leq t'\}$ denote the set of test vectors generated. In the basic version, only one test vector $x' = (x'_1, \ldots, x'_i, \ldots, x'_d)$ suffices. The authentication procedure then comprises the following four steps.

1) For each $1 \leq i \leq d$, $z'_i$ is computed by using the wrap-around addition:

$$z'_i = (w_i + x'_i)_{wrap} = \begin{cases} w_i + x'_i, & w_i + x' < 2^{k_i} q_i \\ w_i + x'_i - 2^{k_i} q_i, & w_i + x' \geq 2^{k_i} q_i. \end{cases} \quad (9)$$

If $z' = (z'_1, \ldots, z'_d)$, then equation (9) can be written in a vectorial form as $z' = (w+x')_{wrap}$. From $w_i, x'_i \in [0, 2^{k_i}q_i]$, it follows that $z'_i \in [0, 2^{k_i}q_i]$. Then the vector $s' = (s'_1, \ldots, s'_d)$ is computed by using:

$$s'_i = \lfloor z'_i/q_i \rfloor, \; 1 \leq i \leq d. \quad (10)$$

This vector is an estimate of the original vector $s=(s_1, \ldots, s_d)$. Namely, $z'_i$ will be close to the original codeword $z_i$ if $x'_i$ is close to $x_i$, and equation (10) is simply the fast decoding algorithm which finds the nearest codeword. More precisely, equations (7) and (9) imply that $(z'-x')_{wrap} = (z-x)_{wrap}$ or, equivalently, that for each $1 \leq i \leq d$:

$$(z'_i - z_i)_{wrap} = (x'_i - x_i)_{wrap}. \quad (11)$$

Accordingly, if $x_i \in [q_i/2, 2^{k_i}q_i - q_i/2]$, then:

$$s'_i = s_i \Leftrightarrow |z'_i - z_i| < \frac{q_i}{2} \Leftrightarrow |x'_i - x_i| < \frac{q_i}{2}. \quad (12)$$

Therefore, if the test feature vector satisfies equation (1), then s'=s and the user can be correctly authenticated.

If in practice, the set of the test vectors $X^{test}$ is allowed to contain more than just one vector, then the error tolerance level can be effectively increased by applying the first step to each of the test vectors and then by applying the majority vote function to the obtained vectors s' to obtain a new vector with a reduced number of errors. More precisely, each coordinate of the new vector is defined as the value with the major number of occurrences among the respective coordinates of the obtained vectors s'. Alternatively, one can reduce $X^{test}$ to a single test vector by computing the mean value of all the test vectors.

2) To perform error correction according to the assumed error tolerance level e, the 2e parity blocks from p are appended to s' and the Reed-Solomon fast decoding algorithm is applied to obtain a corrected vector s''. As a result, we have that s''=s if s' contains at most e erroneously reconstructed feature blocks, that is, if equation (1) is not satisfied for at most e feature coordinates. Conversely, if equation (1) is not satisfied for more than e feature coordinates, then s''=s can be prevented by allowing the fast decoding algorithm to work only up to the decoding radius of at most e errors.

3) The user is authenticated if s''=s. To verify this, the hash function h is applied to s'' to obtain h(s''), which is then compared with the stored value h(s). If h(s'')=h(s), then the user is considered to be successfully authenticated. Namely, if h is collision resistant, then this practically implies that s''=s.

4) If the user is successfully authenticated, then the biometric encryption key is reconstructed by applying the key derivation function to the reduced vector $\hat{s}'' = (\hat{s}''_1, \ldots, \hat{s}''_{d-2e})$, that is, by:

$$S' = F_{keyder}(\hat{s}'') \quad (13)$$

Hence, if the user is successfully authenticated, then S'=S and the secret key is thus also successfully recovered.

As far as the security of the encryption system of the present invention is concerned, there are two basic security aspects interesting for consideration.

One is related to the tradeoff between the false rejection and false acceptance probabilities or rates. Namely, given an acceptably low false rejection probability, the false acceptance probability also has to be acceptably low. This aspect primarily depends on the biometric data and the features chosen, and the error tolerance level has to be adapted appropriately.

The other aspect is related to the biometric template protection, that is, to the possibility of reconstructing the user sensitive data, such as the biometric reference template and biometric encryption key from the data stored in a non-volatile memory, under the assumption that this data is compromised. In the present invention, the stored data for one enrollment consists of the vectors (q, w, p, h(s)). In addition, one may also assume that the biometric encryption key $S = F_{keyder}(\hat{S})$ which is not stored in the non-volatile memory, is compromised through the usage in cryptographic operations.

More precisely, for one enrollment, if q is known, then knowing s is equivalent to knowing z and, due to the fact that $w = (z-x)_{wrap}$, knowing z is equivalent to knowing x, provided that w is known. Further, if p is known, then knowing s is equivalent to knowing $\hat{s}$. So, the biometric system is then compromised (broken) if any of the four vectors x, s, $\hat{s}$, z is reconstructed from (q, w, p, h(s)) or from (q, w, p, h(s)) and $S = F_{keyder}(\hat{S})$ combined. In fact, due to the inherent error tolerance in the encryption system, it suffices to recover any vector x' that is sufficiently close to x, with respect to q and the error tolerance level e.

Consequently, it follows that a necessary security requirement is that the pair of functions (h, $F_{keyder}$) is one-way (in particular, each of them should be one-way). Furthermore, the encryption system can also be considered as compromised if one recovers any vector s' such that h(s')=h(s), as this may enable false user authentication (without recovering x or the biometric encryption key). To prevent this, it is sufficient to choose h as a collision-resistant function. If the two conditions are satisfied, then the resulting security criterion is that it should be computationally infeasible to reconstruct any of the vectors x, s, z from (q, w). Another requirement is that it should be infeasible to guess S (without successful user authentication) by exhaustive search, which means that the bit size of S should be sufficiently large.

More generally, a stronger security requirement relates to a number of enrollments. Accordingly, it should be computationally infeasible to reconstruct the biometric reference template vector x from all stored vectors (q, w) resulting from multiple enrollments. Of course, the vectors x resulting from different enrollments are in general different with a variation which decreases with the size of the training set. So, it suffices to reconstruct any vector that is sufficiently close to any of these template vectors, with respect to the corresponding vector q and the error tolerance level e. An even stronger security criterion would be to replace the reconstruction of x by a partial reconstruction or, more strongly, by deriving any useful information about x. In general, if (q, w) leaks out significant information about x from a single enrollment, then the information about x from multiple enrollments increases with their number and may lead to a partial or essential reconstruction of x.

First, let us consider the security of the proposal contained in the previously cited WO00/51244. Firstly, the codewords used for individual coordinates are similar to those defined by equation (5), but without the additive term $q_i/2$, and it is not defined how to determine $q_i$ and, in particular, it is suggested that $q_i$ is the same for all the coordinates, i.e., independent of i. In this case, the minimum distance decoding does not reduce to the operation of "taking the integer part" but consists in the operation of "rounding to the nearest codeword", which is somewhat more complicated. Also, a practically important issue of the finite precision of the real numbers used is not considered at all.

Secondly, a major difference is in how the difference vector between a randomly chosen codeword vector and a biometric reference template vector is computed. Namely, for each $1 \leq i \leq d$, a usual subtraction of real numbers:

$$w_i = z_i - x_i \quad (14)$$

is used instead of the wrap-around subtraction equation (7) or, in vectorial form, w=z−x is used instead of $w = (z-x)_{wrap}$. It is shown below that the wrap-around arithmetic is essential for the security. Without essential difference, in the security analysis given below, it is assumed that the codewords are defined by equation (5).

Thirdly, another major difference is that it is not suggested to apply a burst-error correcting code such as a Reed-Solomon code to a randomly generated vector $s = (s_1, \ldots, s_d)$, in order to effectively increase the error tolerance level. This is important, as in many applications the number d of features utilized may be relatively large, so that the false rejection probability would be unacceptably high without this additional error correction.

The information about x contained in (q, w), for one enrollment, is best measured in terms of the Shannon entropy, which is simply called the entropy. Recall that for a discrete-valued random variable v with a probability distribution p(v), the Shannon entropy is defined as:

$$H(v) = \sum_v p(v) \log \frac{1}{p(v)}, \quad (15)$$

where the logarithm is to the base 2.

To this end, it is necessary to define the underlying probability distributions corresponding to individual coordinates of the feature vector. More precisely, for each $1 \leq i \leq d$, the coordinate $x_i$ can be distributed arbitrarily (over the segment $[q_i/2, 2^{k_i}q_i - q_i/2]$), with the associated entropy $H(x_i)$, whereas the (codeword) random variable $z_i$ (or equivalently the information block $s_i$) is uniformly distributed over all $2^{k_i}$ values and statistically independent of $x_i$. The known variable $q_i$ is assumed to be fixed. Equivalently, in terms of the conditional entropy, which is defined by using the conditional probabilities, it is assumed that:

$$H(z_i|x_i) = H(z_i) = k_i \quad (16)$$

Note that $H(x_i)$ is essentially the entropy over different users of the biometric system.

First, now it will be shown that $(q_i, w_i)$ necessarily contains certain information about $x_i$. To this end, let us represent each of $x_i$ and $w_i$ in terms two parts, where one part corresponds to the nearest integer of the form $(s_i+1/2)q_i$ and the other to the offset from this integer. In the case of a tie, the smaller integer is taken. More precisely, let:

$$x_i = \hat{x}_i + x_i^{\mathit{off}}$$

$$w_i = \hat{w}_i + w_i^{\mathit{off}} \quad (17)$$

where $x_i^{\mathit{off}}, w_i^{\mathit{off}} \in (-q_{i/2}, q_{i/2}]$. Accordingly, $x_i$ and $w_i$ are uniquely represented by $(\hat{x}_i, x_i^{\mathit{off}})$ and $(\hat{w}_i, w_i^{\mathit{off}})$, respectively. Note that $x_i$ is an $n_i$-bit integer, while $\hat{x}_i$ and $x_i^{\mathit{off}}$ can be represented as $k_i$-bit and $m_i$-bit integers, respectively. For the method disclosed in WO00/51244, without wrap-around arithmetic, $w_i$ and $\hat{w}_i$ can take both positive and negative values.

Now, from equation (7) or (14) it follows that regardless of $z_i$, $x_i^{\mathit{off}}$ uniquely determines $w_i^{\mathit{off}}$ and vice versa. Hence:

$$H(x_i|w_i) = H(\hat{x}_i|w_i) = H(\hat{x}_i|\hat{w}_i, x_i^{\mathit{off}}) \leq H(\hat{x}_i|x_i^{\mathit{off}}) \quad (18)$$

So, the entropy/uncertainty of $x_i$ is necessarily reduced to that of $\hat{x}_i$ if $w_i$ and $q_i$ are known. Ideally, the maximum conditional entropy:

$$H(x_i|w_i) = H(\hat{x}_i|w_i) = H(\hat{x}_i|x_i^{\mathit{off}}) \quad (19)$$

is achieved if and only if $H(\hat{x}_i|\hat{w}_i, x_i^{\mathit{off}}) = H(\hat{x}_i|x_i^{\mathit{off}})$ holds or, equivalently, if and only if $\hat{x}_i$ and $\hat{w}_i$ are mutually statistically independent for any given $x_i^{\mathit{off}}$. This is further equivalent to the (controllable) condition:

$$H(\hat{w}_i|x_i) = H(\hat{w}_i|x_i^{\mathit{off}}). \quad (20)$$

In other words, equation (19) means that the only information that $w_i$ contains about $\hat{x}_i$ is through the offset $x_i^{\mathit{off}}$ which is uniquely determined by the offset $w_i^{\mathit{off}}$. In particular, it may be the case that $\hat{x}_i$ and $x_i^{\mathit{off}}$ are mutually statistically independent, i.e., that $H(\hat{x}_i|x_i^{\mathit{off}}) = H(\hat{x}_i)$.

As equation (7) or (14) implies that:

$$H(x_i|w_i) = H(z_i|w_i) \quad (21)$$

and, on the other hand, $H(z_i|w_i) \leq H(z_i)$, a necessary condition for equation (19) to be satisfied is that:

$$H(\hat{x}_i|x_i^{\mathit{off}}) \leq H(z_i) = k_i. \quad (22)$$

By choosing the random codewords from the whole range of $x_i$, equation (22) is automatically satisfied for every distribution of $\hat{x}_i$, because $H(\hat{x}_i|x_i^{\mathit{off}}) \leq H(\hat{x}_i) \leq k_i$.

Now, it will be shown that the method disclosed in WO00/51244 is not secure as it does not satisfy equation (19) and as it leads to a reconstruction of $x_i$ in the multiple enrollment scenario. Namely, as $z_i$ is statistically independent of $x_i$, equation (14) implies that:

$$H(w_i|x_i) = H(\hat{w}_i|x_i) = H(z_i) = k_i. \quad (23)$$

However, on the other hand, the range of $w_i$ given as $[q_i/2 - x_i, (2^{k_i} - 1/2)q_i - x_i]$ depends on $x_i$, and then also the range of $\hat{w}_i$ depends on $x_i$ even if $x_i^{\mathit{off}}$ is fixed. Therefore, $H(\hat{w}_i|x_i) < H(\hat{w}_i|x_i^{\mathit{off}})$ and hence equation (20), which is equivalent to equation (19), is not satisfied.

Moreover, the information that $w_i$ contains about $\hat{x}_i$ can be rendered practically useful by using multiple enrollments. Assume, for simplicity, that $x_i$ and $q_i$ are essentially (approximately) the same for all the enrollments. Then, equation (14) results in:

$$q_i/2 - w_i^{min} \leq x_i \leq (2^{k_i} - 1/2)q_i - w_i^{max}, \quad (24)$$

where $w_i^{min}$ and $w_i^{max}$ are the minimum and maximum values of $w_i$ over all the enrollments, respectively. So, the range of possible values for $x_i$ is reduced and the more so if the minimum and maximum values of the randomly chosen codewords are closer to $q_i/2$ and $(2^{k_i} - 1/2)q_i$, respectively. In addition, a practical estimator of $x_i$ can be obtained by using the average values, that is:

$$x_i^{est} = 2^{k_i - 1} q_i - w_i^{av} \quad (25)$$

where $w_i^{av}$ denotes the average value (arithmetic mean) of the values $w_i$ resulting from different enrollments.

On the other hand, let us now consider the security of the authentication method according to the present invention. As $z_i$ is statistically independent of $x_i$, then equation (7) implies that equation (23) is satisfied. However, due to the introduced wrap-around arithmetic, equation (7) also implies that the range of $\hat{w}_i$ is the same for any given $x_i$ and is equal to the set of all $2^{k_i}$ codewords $[q_i/2, (2^{k_i} - 1/2)q_i]$. Therefore, it follows that $\hat{w}_i$ is uniformly distributed over this set for any given $x_i$ and, in particular, for any given $x_i^{\mathit{off}}$. Equivalently, it is true that:

$$H(\hat{w}_i|x_i) = H(\hat{w}_i|x_i^{\mathit{off}}) = H(\hat{w}_i) \quad (26)$$

and this further means that equation (20) and hence equation (19) are satisfied. An equation like equation (25) is thus prevented by the wrap-around arithmetic.

Consequently, the authentication method according to the present invention has the maximum achievable security level, with respect to the biometric template protection. This is true for any distribution of the biometric reference template vector $x_i$. In particular, if $x_i$ is uniformly distributed, then $\hat{x}_i$ and $x_i^{\mathit{off}}$ are mutually statistically independent and each is uniformly distributed. Then $H(\hat{x}_i|x_i^{\mathit{off}}) = H(\hat{x}_i) = k_i$ and (19) reduces to:

$$H(x_i|w_i) = H(\hat{x}_i|w_i) = H(\hat{x}_i) = k_i, \quad (27)$$

which means that in this case $w_i$ does not contain any information about $\hat{x}_i$.

Another important security aspect is related to the situation when the biometric encryption key $S = F_{keyder}(\hat{s})$, which is not stored in non-volatile memory, is compromised through the usage in cryptographic operations. Due to the inherent internal randomization, the method proposed in the present invention enables easy revocation of the biometric key. Namely, all what it takes in this case is to repeat the enrollment algorithm (except possibly for the initial phase as the biometric data x and q are already available) and thus reissue the biometric key. A necessary requirement is that the key derivation function is $F_{keyder}$ one-way. If not, then it would be feasible to find a vector s giving rise to a given S, and if this vector is the same as the original vector, then one can compute the corresponding codeword z and then recover x by $x=(z-w)_{wrap}$. Of course, if x or $\hat{x}$ are compromised for a certain user, then it is not secure to use the same biometric system for that user, unless the auxiliary data is kept secret, in which case it is secure to continue the usage of the system, due to the internal randomization.

A further security aspect is related to the requirement that the biometric encryption key should be uniquely linked to the user, that is, to biometric data corresponding to the user. On one hand, this means that the false acceptance probability should be sufficiently low. However, on the other hand, one may impose a stronger requirement, which essentially corresponds to the zero error tolerance level, that it should be computationally infeasible to find collisions, that is, any two different biometric reference template vectors corresponding to different users that give rise to the same biometric encryption key, where the biometric encryption key can be given (in the weaker collision scenario) or arbitrary (in the stronger collision scenario). In the present invention, where the biometric reference template vectors are essentially represented by $\hat{x}=(\hat{x}_1, \ldots, \hat{x}_d)$, this requirement can be formulated as follows: it should be computationally infeasible to find any two different vectors $\hat{x}$ that give rise to the same biometric encryption key, via the same difference vector w.

The method according to the present invention satisfies this requirement by using a collision-resistant key derivation function and by ensuring that, in each coordinate, there is a one-to-one correspondence between the codewords $z_i$ and the numbers $s_i$ used for generating the secret key, which makes it possible for equation (12) to hold. Namely, if $F_{keyder}$ is not collision resistant, then it would be feasible to find two different vectors s giving rise to the same S. Then the corresponding two different codeword vectors z can be computed and, ultimately, the two different biometric reference template vectors x with different parts $\hat{x}$ can be reconstructed by using $x=(z-w)_{wrap}$. In this scenario, S is not required to be controlled. However, if S is given, then to prevent this type of collisions it suffices to choose a one-way key derivation function.

On the other hand, assume that the latter condition is not satisfied, in particular, that instead of $s_i$ as a whole, only a part of it (e.g., a number of the least significant bits) is used to form input to $F_{keyder}$. Note that this is a convenient way of equalizing the bit lengths of blocks for a Reed-Solomon code to be applied for error correction. In this case, as the bit length of each $s_i$ is relatively short, it would be easy to find different vectors s and hence different codeword vectors z and hence different vectors x giving rise to the same input vector for $F_{keyder}$. Moreover, one can also go the other way around, that is, given one vector $\hat{x}$ one can thus find another vector $\hat{x}$ yielding the same input vector for $F_{keyder}$ and hence a collision in the biometric key S.

If S is given and $F_{keyder}$ is one-way, then finding the collisions as explained above is not generally possible. So, if the security is required only in the weaker collision scenario, it may even be possible to equalize the bit lengths of blocks for a Reed-Solomon code by choosing subsets of bits of $s_i$ to form input to $F_{keyder}$. In this case, however, it should be taken into account that the false acceptance probability is increased and that may be difficult to quantify. For this reason, it may be recommendable to use subsets of the least significant bits, as, in each coordinate, this renders the corresponding codewords yielding the same values of the chosen subsets of bits mutually distant with respect to the Euclidean distance.

Finally, as far as the choice of the hash function for user verification and possibly for key derivation is concerned, the hash functions very much in practical use are the ones commonly known as MD5 (R. L. Rivest, "The Message-Digest Algorithm MD5," RFC 1320, Internet Activities Board, Internet Privacy Task Force, 1992) and SHA-1 (NIST, "Secure Hash Standard," FIPS Publication 180-2, http://csrc.nist.gov/publications/fips/fips180-2/fips180-2.pdf, August 2002), but in view of the recent attacks described in X. Wang and H. Yu, "*How to break MD5 and other hash functions*," Proceedings of Eurocrypt 2005, Lecture Notes in Computer Science, vol. 3494, pp. 19-35, 2005, and X. Wang, Y. Lisa Yin, and H. Yu, "*Finding collisions in the full SHA-1*," Proceedings of Crypto 2005, Lecture Notes in Computer Science, vol. 3621, pp. 17-36, 2005, it may be prudent to use other functions from the SHA family such as SHA-256 (NIST, "Secure Hash Standard," FIPS Publication 180-2, http://csrc.nist.gov/publications/fips/fips180-2/fips180-2.pdf, August 2002).

The invention claimed is:

1. A biometric user authentication method, comprising:
   enrolling a user based on user's biometric samples to generate user's reference data; and
   authenticating the user based on a user's live biometric sample and the user's reference data,
   wherein enrolling a user comprises:
   acquiring the user's biometric samples;
   extracting an enrollment feature vector from each user's biometric sample;
   computing a biometric reference template vector as a mean vector based on the enrollment feature vectors;
   computing a variation vector based on the enrollment feature vectors and the mean vector;
   randomly generating an enrollment secret vector;
   computing an enrollment code vector based on the enrollment secret vector and the variation vector;
   computing a difference vector as a wrap-around difference between the enrollment code vector and the mean vector;
   computing an error tolerance level;
   computing an error correction vector based on the enrollment secret vector to enable error correction during the user authentication phase if said error tolerance level is different from zero; and
   storing the variation vector, the difference vector, and the error correction vector as a first part of the user's reference data to be used during the user authentication phase.

2. The method of claim 1, wherein:
   each enrollment feature vector is made up of a number of enrollment feature values each computed based on the corresponding user's biometric sample;
   the mean vector is made up of a number of means values each being proportional to a mean value of a corresponding enrollment feature value in the enrollment feature vectors;
   the variation vector is made up of a number of variation values each being proportional to a standard deviation of a corresponding enrollment feature value in the enrollment feature vector with respect to a corresponding mean value in the mean vector;

the enrollment secret vector is made up of a number of uniformly generated enrollment secret values;

the enrollment code vector is made up of a number of code values each computed based on a corresponding variation value and a corresponding enrollment secret value according to the following formula:

$$z_i = s_i \cdot q_i + q_i/2$$

where:
$z_i$ is a code value,
$q_i$ is a variation value, and
$s_i$ is a secret value;

the difference vector is made up of a number of difference values each computed as a wrap-around subtraction between a corresponding enrollment code value and a corresponding mean value according to the following formula:

$$w_i = (z_i - x_i)_{wrap} = \begin{cases} z_i - x_i, & z_i \geq x_i \\ z_i - x_i + 2^{k_i} q_i, & z_i < x_i \end{cases}$$

where:
$z_i$ is a code value,
$q_i$ is a variation value,
$x_i$ is a biometric reference template value, and
$k_i$ is a bit length of a secret value in the corresponding binary representation; and the error correction vector is made up of a number of parity values twice as many as the error tolerance level, and the parity values are obtained from the enrollment secret values by implementing a burst-error correcting code capable of correcting any number of erroneous values less than or equal to the error tolerance level.

3. The method of claim 1, wherein enrolling a user further comprises:
computing a user enrollment vector based on the enrollment secret vector, the user enrollment vector, being obtained by applying to the enrollment secret vector a cryptographic hash function; and
storing the user enrollment vector as a second part of the user's reference data to be used during the user authentication phase.

4. The method of claim 3, wherein input to said cryptographic hash function comprises user-specific information comprising personal data, passwords, and PINs.

5. The method of claim 1, further comprising:
computing a biometric encryption key based on the enrollment secret vector.

6. The method of claim 5, wherein computing a biometric encryption key comprises:
computing a reduced enrollment secret vector by removing from the enrollment secret vector a number of enrollment secret values twice as many as the error tolerance level, the removed enrollment secret values being those with the highest bit lengths in the corresponding binary representation; and
computing the biometric encryption key by applying an encryption key derivation function to the reduced enrollment secret vector.

7. The method of claim 6, wherein input to said encryption key derivation function comprises user-specific information comprising personal data, passwords, and PINs.

8. The method of claim 1, wherein authenticating the user based on a user's live biometric sample and the user's reference data comprises:
acquiring a user's live biometric sample;
extracting an authentication feature vector from the user's live biometric sample;
computing an authentication code vector as a wrap-around addition between the difference vector computed during the user enrollment phase and the authentication feature vector;
computing an authentication secret vector based on the authentication code vector and the variation vector;
computing a corrected authentication secret vector based on the authentication secret vector and the error correction vector computed during the user enrollment phase; and
authenticating the user based on the corrected secret vector.

9. The method of claim 8, wherein:
the authentication feature vector (x') is made up of a number (d) of authentication feature values ($x_i'$) each computed based on the user's live biometric sample;
the authentication code vector (z') is made up of a number (d) of authentication code values ($z_i'$) each computed as a wrap-around addition between a corresponding difference value ($w_i$) and a corresponding authentication feature value ($x_i'$) according to the following formula:

$$z_i' = (w_i + x_i')_{wrap} = \begin{cases} w_i + x_i', & w_i + x' < 2^{k_i} q_i \\ w_i + x_i' - 2^{k_i} q_i, & w_i + x' \geq 2^{k_i} q_i \end{cases}$$

the authentication secret vector (s') is made up of a number (d) of authentication secret values ($s_i'$) each computed based on a corresponding authentication code value ($z_i'$) and a corresponding variation value ($q_i$) according to the following formula:

$$s_i' = \lfloor z_i'/q_i \rfloor$$

the corrected authentication secret vector (s") is obtained by appending to the authentication secret vector (s') the parity values ($p_i$) in the error correction vector (p) computed during the user enrollment phase and by applying a decoding algorithm of said burst-error correcting code to the authentication secret vector (s') with appended parity values ($p_i$).

10. The method of claim 8, wherein authenticating the user based on the corrected secret vector comprises:
computing a user authentication vector based on the corrected authentication secret vector, the user authentication vector being obtained by applying to the corrected authentication secret vector a cryptographic hash function;
comparing the user authentication vector with the stored user enrollment vector; and
successfully authenticating the user if the user authentication vector is equal to the stored user enrollment vector.

11. The method of claim 8, further comprising:
computing a biometric encryption key based on the corrected authentication secret vector.

12. The method of claim 11, wherein computing a biometric encryption key comprises:
computing a reduced corrected authentication secret vector by removing from the corrected authentication secret vector a number of corrected authentication secret values twice as many as the error tolerance level, the removed corrected authentication secret values being those with the highest bit lengths in the corresponding binary representation; and computing the biometric encryption key by applying an encryption key derivation function to the reduced corrected authentication secret vector, if the user is successfully authenticated, the biometric encryption key computed during the user authentication phase being equal to the biometric encryption key computed during the user enrollment phase.

13. The method of claim 2, wherein said burst-error correcting code is a Reed-Solomon code.

14. A method for generating a biometric encryption key, comprising:
enrolling a user based on user's biometric samples to generate user's reference data;
authenticating the user based on a user's live biometric sample and the user's reference data, by:
acquiring a user's live biometric sample,
extracting an authentication feature vector from the user's live biometric sample,
computing an authentication code vector as a wrap-around addition between the difference vector computed during the user enrollment phase and the authentication feature vector,
computing an authentication secret vector based on the authentication code vector and the variation vector,
computing a corrected authentication secret vector based on the authentication secret vector and the error correction vector computed during the user enrollment phase, and
authenticating the user based on the corrected secret vector; and
wherein enrolling a user comprises:
acquiring the user's biometric samples,
extracting an enrollment feature vector from each user's biometric sample,
computing a biometric reference template vector as a mean vector based on the enrollment feature vectors,
computing a variation vector based on the enrollment feature vectors and the mean vector,
randomly generating an enrollment secret vector,
computing an enrollment code vector based on the enrollment secret vector and the variation vector,
computing a difference vector as a wrap-around difference between the enrollment code vector and the mean vector,
computing an error tolerance level,
computing an error correction vector based on the enrollment secret vector to enable error correction during the user authentication phase if said error tolerance level is different from zero, and
storing the variation vector, the difference vector, and the error correction vector as a first part of the user's reference data to be used during the user authentication phase; and
computing the biometric encryption key based on the corrected authentication secret vector.

15. A biometric user authentication system, comprising:
an enrollment subsystem configured to:
acquire the user's biometric samples,
extract an enrollment feature vector from each user's biometric sample,
compute a biometric reference template vector as a mean vector based on the enrollment feature vectors,
compute a variation vector based on the enrollment feature vectors and the mean vector,
randomly generate an enrollment secret vector,
compute an enrollment code vector based on the enrollment secret vector and the variation vector,
compute a difference vector as a wrap-around difference between the enrollment code vector and the mean vector,
compute an error tolerance level,
compute an error correction vector based on the enrollment secret vector to enable error correction during the user authentication phase if said error tolerance level is different from zero, and
store the variation vector, the difference vector, and the error correction vector as a first part of the user's reference data and
an authentication subsystem configured to authenticate the user based on a user's live biometric sample and the user's reference data.

16. A biometric encryption key generation system, comprising:
an enrollment subsystem configured to:
acquire the user's biometric samples,
extract an enrollment feature vector from each user's biometric sample,
compute a biometric reference template vector as a mean vector based on the enrollment feature vectors,
compute a variation vector based on the enrollment feature vectors and the mean vector,
randomly generate an enrollment secret vector,
compute an enrollment code vector based on the enrollment secret vector and the variation vector,
compute a difference vector as a wrap-around difference between the enrollment code vector and the mean vector,
compute an error tolerance level,
compute an error correction vector based on the enrollment secret vector to enable error correction during the user authentication phase if said error tolerance level is different from zero, and
store the variation vector, the difference vector, and the error correction vector as a first part of the user's reference data; and
an authentication subsystem configured to authenticate the user based on a user's live biometric sample and the user's reference data, wherein the authentication subsystem is configured to:
acquire a user's live biometric sample,
extract an authentication feature vector from the user's live biometric sample,
compute an authentication code vector as a wrap-around addition between the difference vector computed during the user enrollment phase and the authentication feature vector,
compute an authentication secret vector based on the authentication code vector and the variation vector,
compute a corrected authentication secret vector based on the authentication secret vector and the error correction vector computed during the user enrollment phase,
authenticate the user based on the corrected secret vector, and
compute a biometric encryption key based on the corrected authentication secret vector.

* * * * *